(12) United States Patent
McLaughlin, II (10) Patent No.: US 11,255,982 B2
(45) Date of Patent: Feb. 22, 2022

(54) RADIATION DETECTION APPARATUS HAVING A REFLECTOR

(71) Applicant: SAINT-GOBAIN CERAMICS & PLASTICS, INC., Worcester, MA (US)

(72) Inventor: Michael Terrance McLaughlin, II, Lyndhurst, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 16/699,444

(22) Filed: Nov. 29, 2019

(65) Prior Publication Data
US 2020/0174140 A1 Jun. 4, 2020

Related U.S. Application Data

(60) Provisional application No. 62/773,358, filed on Nov. 30, 2018.

(51) Int. Cl.
*G01T 1/20* (2006.01)

(52) U.S. Cl.
CPC .......... *G01T 1/2002* (2013.01); *G01T 1/2018* (2013.01)

(58) Field of Classification Search
CPC ....... G01T 1/2002; G01T 1/2018; G01T 1/20; G01T 1/164; G01T 1/24
See application file for complete search history.

(56) References Cited

U.S. PATENT DOCUMENTS

| 4,514,632 A | 4/1985 | Barrett |
| 5,070,249 A | 12/1991 | White |
| 5,796,109 A | 8/1998 | Frederick et al. |
| 6,194,726 B1 | 2/2001 | Pi et al. |
| 6,359,282 B1 | 3/2002 | Sekela |
| 6,909,097 B2 | 6/2005 | Schreiner et al. |

(Continued)

FOREIGN PATENT DOCUMENTS

| CN | 104688261 A | 6/2015 |
| GB | 2521766 A | 7/2015 |

(Continued)

OTHER PUBLICATIONS

Yang et al. "Li co-doped NaI: Ti (NaIL)—A Large Volume Neutron-Gamma Scintillator with Exceptional Pulse Shape Discrimination" IEEE Transactions on Nuclear Science—Jun. 2017, p. 1-9. (Year: 2017).*

(Continued)

*Primary Examiner* — David P Porta
*Assistant Examiner* — Mamadou Faye
(74) *Attorney, Agent, or Firm* — Abel Schillinger, LLP; Robert N. Young (57) ABSTRACT

A radiation detection apparatus may include a scintillator to emit scintillating light in response to absorbing radiation, a photosensor to generate an electronic pulse in response to receiving the scintillating light, and a reflector surrounding the photosensor. The photosensor may be coupled to a wiring board and the reflector may be coupled to the wiring board. The radiation detection apparatus can be more compact and more rugged as compared to radiation detection apparatuses that include a photomultiplier tube.

18 Claims, 7 Drawing Sheets

(56) References Cited

U.S. PATENT DOCUMENTS

| | | |
|---|---|---|
| 7,879,284 B2 | 2/2011 | Martins Loureiro et al. |
| 8,198,597 B2 | 6/2012 | Burr et al. |
| 8,426,823 B2 | 4/2013 | Schulz et al. |
| 8,581,188 B2 | 11/2013 | Barbi et al. |
| 8,785,841 B1 | 7/2014 | Stephenson et al. |
| 9,658,344 B1 | 5/2017 | Chai et al. |
| 9,804,275 B2 | 10/2017 | Niu et al. |
| 10,036,815 B2 | 7/2018 | Tonami et al. |
| 2007/0080297 A1* | 4/2007 | Clarke .................... G01T 1/167 250/366 |
| 2008/0099689 A1 | 5/2008 | Nygard et al. |
| 2008/0240341 A1 | 10/2008 | Possin et al. |
| 2009/0121142 A1 | 5/2009 | Heismann et al. |
| 2011/0017916 A1 | 1/2011 | Schulz et al. |
| 2011/0192981 A1 | 8/2011 | Menge et al. |
| 2011/0240864 A1 | 10/2011 | Degenhardt et al. |
| 2012/0043468 A1 | 2/2012 | Flitsch et al. |
| 2013/0168554 A1 | 7/2013 | Howe et al. |
| 2014/0091226 A1 | 4/2014 | Duraj et al. |
| 2014/0231657 A1 | 8/2014 | Bolotnikov et al. |
| 2014/0325828 A1 | 11/2014 | Stoller |
| 2014/0339409 A1 | 11/2014 | Stephenson et al. |
| 2015/0069250 A1 | 3/2015 | Schmand et al. |
| 2015/0234057 A1 | 8/2015 | Brookes et al. |
| 2015/0276949 A1 | 10/2015 | Grobshtein et al. |
| 2016/0011126 A1 | 1/2016 | Lingren et al. |
| 2016/0266260 A1* | 9/2016 | Preston .................... G01T 1/208 |
| 2016/0282476 A1 | 9/2016 | Kappler et al. |
| 2016/0291171 A1 | 10/2016 | Panniello et al. |
| 2018/0033526 A1 | 2/2018 | Bush et al. |
| 2019/0000403 A1* | 1/2019 | Chen .................... A61B 6/037 |
| 2019/0099138 A1* | 4/2019 | Kim .................... G01T 1/208 |
| 2020/0025950 A1 | 1/2020 | Frank et al. |
| 2020/0025952 A1 | 1/2020 | Frank et al. |

FOREIGN PATENT DOCUMENTS

| | | |
|---|---|---|
| JP | H05264735 A | 10/1993 |
| JP | H07306270 A | 11/1995 |
| JP | 2008525161 A | 7/2008 |
| JP | 2009025308 A | 2/2009 |
| JP | 2010527021 A | 8/2010 |
| JP | 2012011207 A | 1/2012 |
| JP | 2012066063 A | 4/2012 |
| JP | 2013002828 A | 1/2013 |
| JP | 5446011 B2 | 3/2014 |
| JP | 2015099149 A | 5/2015 |
| KR | 20160060208 A | 5/2016 |
| WO | 2006071922 A2 | 7/2006 |
| WO | 2015172026 A1 | 11/2015 |
| WO | 2016123231 A1 | 8/2016 |
| WO | 2017083114 A1 | 5/2017 |
| WO | 2019084155 A1 | 5/2019 |
| WO | 2019221 A2 | 11/2019 |

OTHER PUBLICATIONS

Barton "Effect of SSPM Surface Coating on Light Collection Efficiency and Optical Crosstalk for Scintillation Detection" Lawrence Berkeley National Laboratory, Oct. 21, 2009, p. 1-7 (Year: 2009).*

NPL search (Year: 2021).*

"MPPC module for PET," Hamamatsu, 2016, 9 pages.

International Search Report and Written Opinion for PCT/US2018/057337, dated Jan. 31, 2019, 12 pages.

International Search Report and Written Opinion for PCT/US2018/057333, dated Dec. 12, 2019, 13 pages.

International Search Report and Written Opinion for PCT/US2019/062858, dated Mar. 20, 2020, 14 pages.

* cited by examiner

RADIATION DETECTION APPARATUS HAVING A REFLECTOR

CROSS-REFERENCE TO RELATED APPLICATIONS

This application claims priority under 35 U.S.C § 119(e) to U.S. Provisional Application No. 62/773,358, entitled "RADIATION DETECTION APPARATUS HAVING A REFLECTOR," by Michael Terrance McLAUGHLIN II et al., filed Nov. 30, 2018, which is assigned to the current assignee hereof and is incorporated herein by reference in its entirety.

FIELD OF THE DISCLOSURE

The present disclosure is directed to radiation detection apparatuses having analyzers within housings.

RELATED ART

A radiation detection apparatus, which can be used to detect radiations such as X-ray, gamma-ray, alpha, beta radiations, can include a sealed housing having components therein. The radiation detection apparatus can include a scintillator and a SiPM, where the scintillator reacts to detecting a type of radiation by outputting photons which can be directed to and detected by the SiPM.

A SiPM is a semiconductor-based device (typically silicon) that can deliver an electronic signal with a total charge proportional to the number of absorbed photons. It consists of a large number of Avalanche Photodiodes (APDs) which are operated in Geiger mode. These Geiger-mode Avalanche Photodiodes (G-APDs), which may also be referred to as Single Photon Avalanche Photodiodes, are connected in parallel via individual quenching resistors. APDs convert incoming photons to an electrical signal, and amplify it through avalanche multiplication. APDs require a voltage applied across its terminals to operate. When this applied reverse voltage (or "bias voltage") is larger than the breakdown voltage, the APD is operating in what is called Geiger-mode. A SiPM operating in Geiger-mode can measure light intensity by counting photons. The number of photons a SiPM can count per unit time depends on the number of G-APDs included in the SiPM, and how quickly the individual G-APDs can recharge after being discharged upon detecting a photon. Since a single G-APD generates the same output signal regardless of how many photons are simultaneously being absorbed by it, a SiPM may be chosen to provide enough G-APDs (or pixels) to adequately handle the expected photon density so as not to saturate the SiPM and as a result undercount the photons.

The functions that the radiation detection apparatus can performed may be determined by the components. The G-APDs in the SiPM are connected in parallel, forming a parallel array of G-APDs and are normally spaced with a pitch of 25-100 µm. However, noise levels of the SiPM and recharge rates of the G-APDs negatively impact the accuracy and performance of the SiPM. Further improvements in radiation detection apparatuses are desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The term "compound semiconductor" is intended to mean a semiconductor material that includes at least two different elements. Examples include SiC, SiGe, GaN, InP, $Al_xGa_{(1-x)}N$ where $0 \leq x < 1$, CdTe, and the like. A III-V semiconductor material is intended to mean a semiconductor material that includes at least one trivalent metal element and at least one Group 15 element. A III-N semiconductor material is intended to mean a semiconductor material that includes at least one trivalent metal element and nitrogen. A Group 13-Group 15 semiconductor material is intended to mean a semiconductor material that includes at least one Group 13 element and at least one Group 15 element. A II-VI semiconductor material is intended to mean a semiconductor material that includes at least one divalent metal element and at least one Group 16 element.

The term "avalanche photodiode" refers to a single photodiode having a light-receiving area of least 1 $mm^2$ and is operated in a proportional mode.

The term "SiPM" is intended to mean a photomultiplier that includes a plurality of photodiodes, wherein each of the photodiodes have a cell size less than 1 $mm^2$, and the photodiodes are operated in Geiger mode. The semiconductor material for the diodes in the SiPM can include silicon, a compound semiconductor, or another semiconductor material.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

The use of the word "about", "approximately", or "substantially" is intended to mean that a value of a parameter is close to a stated value or position. However, minor differences may prevent the values or positions from being exactly as stated. Thus, differences of up to ten percent (10%) (and up to twenty percent (20%) for semiconductor doping concentrations) for the value are reasonable differences from the ideal goal of exactly as described.

Group numbers corresponding to columns within the Periodic Table of Elements based on the IUPAC Periodic Table of Elements, version dated Nov. 28, 2016.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation, radiation detection and ranging arts.

A radiation detection apparatus can be configured such that the functionality of the apparatus can be changed without having to remove an analyzer from a housing in which the analyzer is contained. The functionality can be changed by activating or deactivating a function including counting radiation events, discriminating between different types of radiation (e.g., discriminating between gamma radiation and neutrons), identification of an isotope corresponding to the radiation, provide gain compensation for the photosensor, provide information regarding adjustment for light output of the scintillator as a function of temperature, another suitable function, or any combination thereof In an aspect, the radiation detection apparatus can include a scintillator to emit scintillating light in response to absorbing radiation; a photosensor to generate an electronic pulse in response to receiving the scintillating light; an analyzer to determine a characteristic of the radiation, and a housing that contains the scintillator, the photosensor, and the analyzer, wherein the radiation detection apparatus to is configured to allow functionality be changed without removing the analyzer from the housing.

In an embodiment, the radiation detection apparatus can include a scintillator to emit scintillating light in response to absorbing radiation; a photosensor to generate an electronic pulse in response to receiving the scintillating light; an analyzer to determine a characteristic of the radiation; and a housing that contains the scintillator, the photosensor, and the analyzer. As used herein, "photosensor" refers to one or more SiPMs, where multiple SiPMs can be arranged in an array, such as a 1×2 array, a 2×2 array, a 4×4 array, etc.

In an embodiment, the radiation detection apparatus can further include an interface board coupled to the photosensor and the analyzer. In another embodiment, the photosensor can include a semiconductor-based photomultiplier (SiOM). As compared to a radiation detection apparatus with a photomultiplier tube (PMT), a radiation detection apparatus with the semiconductor-based photomultiplier can be made more compact and is more rugged. The semiconductor-based photomultiplier allows power to be provided by a cable connected to the radiation detection apparatus, and the interface board can provide sufficient power to operate the semiconductor-based photomultiplier. Attention is directed to the figures and non-limiting embodiments.

Figure 1:
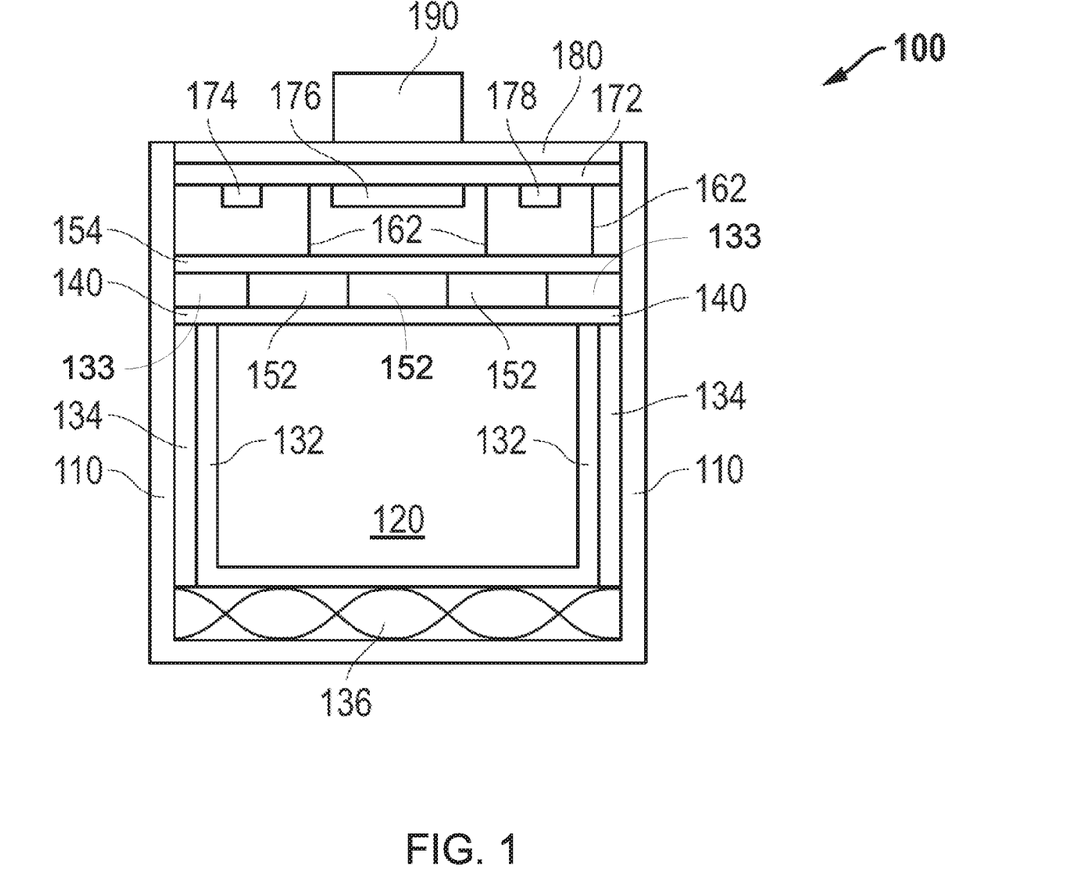
FIG. 1 includes an illustration of a cross-sectional view of a radiation detection apparatus in accordance with an embodiment.

FIG. 1 illustrates an embodiment of a radiation detection apparatus 100. The radiation detection apparatus 100 can be a medical imaging apparatus, a well logging apparatus, a security inspection apparatus, for military applications, or the like. The radiation detection apparatus 100 includes a housing 110 that includes components therein. The housing may be removably sealed or hermetically sealed. In a particular embodiment, the housing 110 can be sealed in accordance with IP Code rating of IP67, wherein the IP Code is International Electrotechnical Commission standard 60529, Edition 2.2 (2013). Alternatively, or in addition to, components within the housing 110 can be individually hermetically sealed prior to installation in the housing.

The housing 110 contains a scintillator 120 that can include a material that emits scintillating light in response to absorbing radiation, such as gamma rays, ionized particles, or the like. An exemplary non-limiting material for the scintillator 120 can include an alkali halide, a rare earth halide, an elpasolite, a rare-earth containing silicate, perovskite oxide, or the like. For example, the scintillator 120 can comprise any one of a NaI(Tl) crystal, a CsI(Tl) crystal, a CsI(Na) crystal, a LaBr$_3$ crystal, a CLLB crystal, a LYSO crystal, a LSO crystal, a CdWO$_4$ crystal, a CeBr$_3$ crystal, a Strontium Iodide crystal, a BGO crystal, a CaF$_2$(Eu) crystal, etc. The NaI(Tl) crystal is a sodium iodide scintillation crystal activated with thallium. The CsI(Tl) crystal is a cesium iodide scintillation crystal activated with thallium. The CsI(Na) crystal is a cesium iodide scintillation crystal activated with sodium. The LaBr$_3$ crystal is a Lanthanum Bromide crystal. The (Cs$_2$LiLaBr$_6$(Ce)) crystal is a gamma-neutron scintillation crystal. The LYSO crystal (Lu$^{1.8}$Y$^{.2}$SiO$^5$:Ce) is a Cerium doped Lutetium based scintillation crystal. The LSO crystal (Lu$_2$SiO$_5$(Ce)) is a Cerium doped Lutetium Oxyorthosilicate based scintillation crystal. The CdWO$_4$ crystal is a Cadmium tungstate (CdWO$_4$) scintillation crystal. The CeBr$_3$ crystal is a cerium bromide (CeBr$_3$) scintillation crystal. The BGO crystal (Bi$_4$Ge$_3$O$_{12}$) is a Bismuth Germanate based scintillation crystal. The CaF$_2$(Eu) crystal is a Europium doped Calcium Fluoride based scintillation crystal. Any of these scintillation crystals can be used in the articles and radiation detectors described in this disclosure.

When the housing 110 is sealed, materials that are hygroscopic or adversely interact with ambient conditions adjacent to the housing 110 can be protected. The scintillator 120 is surrounded by a reflector 132. The reflector 132 can laterally surround the scintillator 120 or may surround the scintillator on all sides. The reflector 132 can include specular reflector, a diffuse reflector, or both. One or more resilient members can help to keep the scintillator 120 in place within the housing 110. In the embodiment as illustrated, an elastomeric material 134 can surround the reflector 132, and a spring 136 may be disposed between the scintillator 120 and the housing 110. Although not illustrated, a plate may be used between the spring 136 and the scintillator 120 to distribute more uniformly pressure along the surface of the scintillator 120.

A photosensor 152 can be optically coupled to the scintillator 120 via an optical coupler 140. In one embodiment, the photosensor 152 can be a semiconductor-based photomultiplier which can include a SiPM or an avalanche photodiode. In one embodiment, the semiconductor-based photomultiplier can include one or more SiPMs 152. As seen in the embodiment as illustrated, SiPMs 152 can be mounted on a printed wiring board 154. In one embodiment, the SiPMs 152 can be between the printed wiring board 154 and the optical coupler 140. In one embodiment, the optical coupler 140 can be silica. In another embodiment, the SiPMs 152 can be coupled to the optical coupler 140 using an epoxy or rubber silicone. Each SiPM 152 can include several thousand microcells that detect the photons when the photons interact with individual microcells of the SiPM. However, some photons generated by the scintillator 120 may miss the SiPMs 152 and may be absorbed by the PCB 154 or otherwise prevented from interacting with the SiPMs 152. Therefore, photons may not be properly counted by the detector 100. The number of photons lost in this manner can be minimized by reducing the area of the PCB 154 that is not covered by SiPMs 152. Populating the PCB surface with more SiPMs 152 can reduce the area of the PCB 154 available for interaction with the photons, thereby minimizing a loss of the photons. Unfortunately, this can significantly increase the cost of the detector 100.

A reflector 133 can be on the same plane as and surround the SiPMS 152. The reflector 133 can reflect the photons, that may otherwise have been lost to the PCB, back to the scintillator 120, and since all sides of the scintillator 120 (except the side adjacent the photosensor 150) are covered with a reflector 132, then the photons may continue to be reflected within the scintillator 120 until the photons are detected and absorbed by the SiPMs 152. The reflector 133 can be a diffuse reflector. In one embodiment, the reflector 133 is a diffuse white reflector. In one embodiment, the reflector 133 can be a material selected from the group consisting of fluoropolymer of tetrafluoroethylene, teflon-like material, meilex, and mylar tape. In one embodiment, the reflector 133 can have a reflection coefficient of between 80%-99% as measured at 440 nm. In one embodiment, the reflector 133 can have a reflection coefficient of between 90%-99% as measured at wavelengths between 250 nm and 3400 nm. In one embodiment, the reflector 133 can have a reflection coefficient of between 95%-99% as measured at wavelengths between 350 nm and 1200 nm. The reflector 133 has been shown to provide significant improvement over detectors 100 that use the photosensor 150 that does not include a reflector 133. Additionally, the performance of a detector 100 using a 2×2 array of SiPMs 152 with a reflector 133 has been shown to provide comparable performance with a detector 100 using a 4×4 array of SiPMs 152. Therefore, fewer SiPMs 152 can achieve a desired performance for a detector 100, without the higher cost of a detector using more SiPMs 152 (e.g. detectors with 8 SiPMs, 16 SiPMs, 32 SiPMs, etc.). However, it should be understood that the performance of the higher count SiPM detectors 100 can also be improved by using the reflector 133.

As seen in FIGS. 2A-2F, the reflector 133 can be mounted on the printed wiring board 154 surrounding the photosensor 152. In one embodiment, the reflector 133 can extend beyond the edges of the printed wiring board 154. In one embodiment, the reflector 133 can be adjacent to and on the same plane as the photosensor 152. In one embodiment, the reflector 132 can be the same material as the reflector 133. In another embodiment, the reflector 133 can be in the space between each photosensor 152. For example, in one embodiment, the photosensor 152 can be a plurality of SiPMs 152 spaced apart from one another with reflector material 133 in between each SiPM. In one embodiment, the reflector 133 can cover the surface area around the SiPMs 152. In one embodiment, the reflector 133 can abut the periphery of the photosensor 152. In another embodiment, the reflector 133 can be adjacent to the periphery of the photosensor 152. In one embodiment, the reflector 133 can be adjacent to at least one side of the periphery of the photosensor 152. In another embodiment, the reflector 133 can surround two sides of the periphery of the photosensor 152. In another embodiment, the reflector 133 can laterally surround between 1 and 4 sides of the periphery of the photosensor 152. In another embodiment, the reflector 133 can cover at least 2% of the surface area not occupied by the photosensor 152. The reflector 133 can cover at least 5% of the surface area not occupied by the photosensor 152, such as 10%, or at least 30%, or at least 50%, or at least 70% or at least 90% or at least 95%. In one embodiment, the reflector 133 can cover between 1% and 95% of the surface area on the wiring board 154 not occupied by the photosensor 152. In another embodiment, a surface area of the reflector 133 can cover between 1% and 95% of the surface area of the scintillator. The reflector 133 can increase the signal reaching the photosensor 152. An electronic pulse from the SiPMs 152 can be routed through the printed wiring board 154 and electrical connectors 162 to an interface board 172. In one embodiment, the printed wiring board 154 can receive signals from the SiPMs 152 and perform conditioning of the signals (e.g. signal amplification) before sending the signals to the interface board 172.

The electrical connectors 162 can be wires (illustrated), solder balls, or the like. The interface board 172 can include electronic components 174, 176, and 178. The interface board 172 can further include additional electronic components and a charge storage element, such as a battery, a capacitor, or the like (not shown). One of the electronic components can include a universal asynchronous receiver/transmitter. In another embodiment, some or all of the components illustrated on the bottom side of the interface board may be on the top side of the interface board 172. Electrical connectors 162 can extend through a lid 180 and into a connector section 190 that is configured to receive an external connector. The number and arrangement of connectors 162 and design of the connector section 190 can depend on the type of external connector used.

Figure 2A:
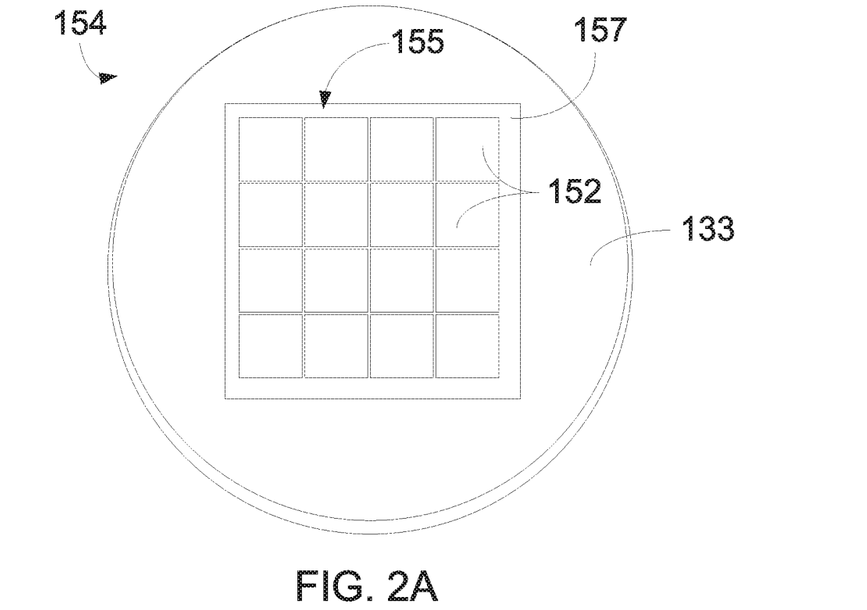
FIGS. 2A-2F include illustrations of a bottom surface of a wiring board as illustrated in FIG. 1.
Figure 2B:
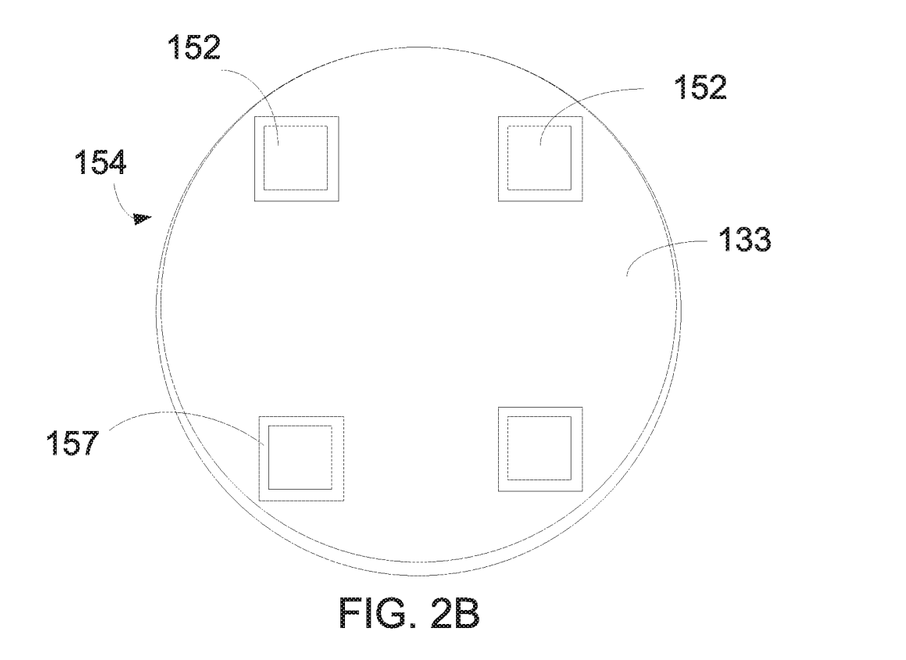

FIG. 2A includes a view of the bottom surface of the wiring board 154, according to one embodiment. The wiring board 154 has a bottom surface 155. One or more SiPMs 152 can be mounted on the bottom surface 155 of the wiring board 154 adjacent to one another. While FIG. 2A illustrates a 4×4 SiPM unit, any number of SiPMs can be used. In one embodiment, the SiPMs are centrally located on the bottom surface 155 of the wiring board. In another embodiment, one or more SiPMs 152 can be located towards the periphery of the wiring board 154, as seen in FIG. 2B. Surrounding the one or more SiPMs 152 and attached to the bottom surface 155 can be the reflector 133. In one embodiment, a gap or space 157 may be between the SiPMs 152 and the reflector 133 such that the bottom surface 155 of the wiring board 154 is exposed. In another embodiment, the reflector 133 is adjacent to and touches the SiPMs 152 such that there is no exposed bottom surface 155 of the wiring board 154. In one embodiment, the reflector 133 can cover the surface area around the SiPMs 152. In another embodiment, the reflector 133 can cover at least 2% of the surface area not occupied by the photosensor 152. The reflector 133 can cover at least 5% of the surface area not occupied by the photosensor 152, such as 10%, or at least 30%, or at least 50%, or at least 70% or at least 90% or at least 95%. In one embodiment, the reflector 133 can cover between 1% and 95% of the surface area on the wiring board 154 not occupied by the photosensor 152.

FIG. 2B includes a view of the bottom surface of the wiring board 154, according to one embodiment. The wiring board 154 can include at least one SiPMs 152. As seen in the embodiment of FIG. 2A, the SiPMs 152 can be a discontinuous 2×2 matrix. In other words, individual SiPMs can be spread apart from one another on the bottom surface 155 of the wiring board 154. In one embodiment, the SiPMs 152 can be along the edges of the wiring board and not in the center. In one embodiment, there can be a gap 157 between the SiPMs and the reflector 133. The gap 157 could expose a portion of the bottom surface 155 of the wiring board. The reflector 133 can surround each SiPM 152 and can cover at least 95% of the surface area of the bottom surface of the wiring board not occupied by the SiPMs 152.

Figure 2C:
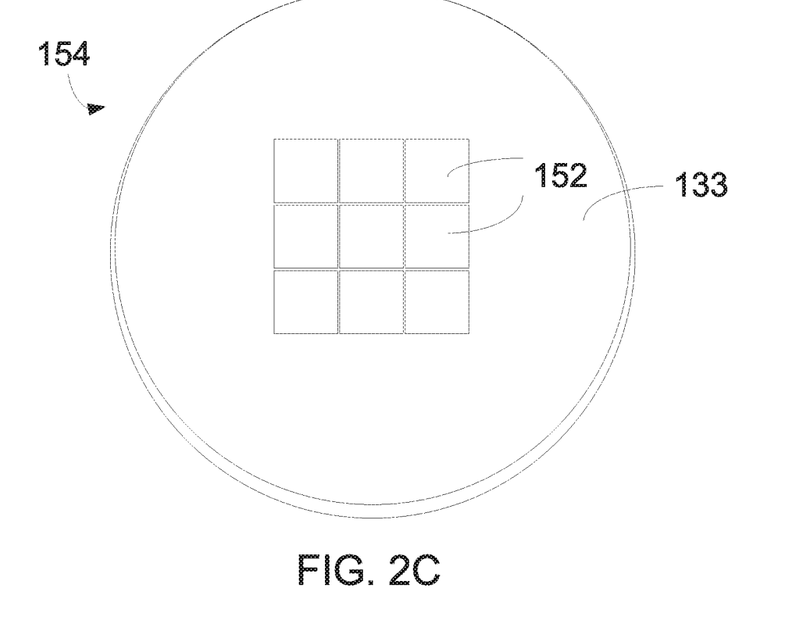

FIG. 2C includes a view of the bottom surface of the wiring board 154, according to one embodiment. The wiring board 154 can include at least one SiPMs 152. As seen in the embodiment of FIG. 2C, the SiPMs 152 can be a 3×3 matrix located towards the center of the wiring board 154. As seen in the embodiment of FIG. 2C, the reflector 133 can abut and surround the SiPMs 152 such that there is no exposed bottom surface of the wiring board 154.

Figure 2D:
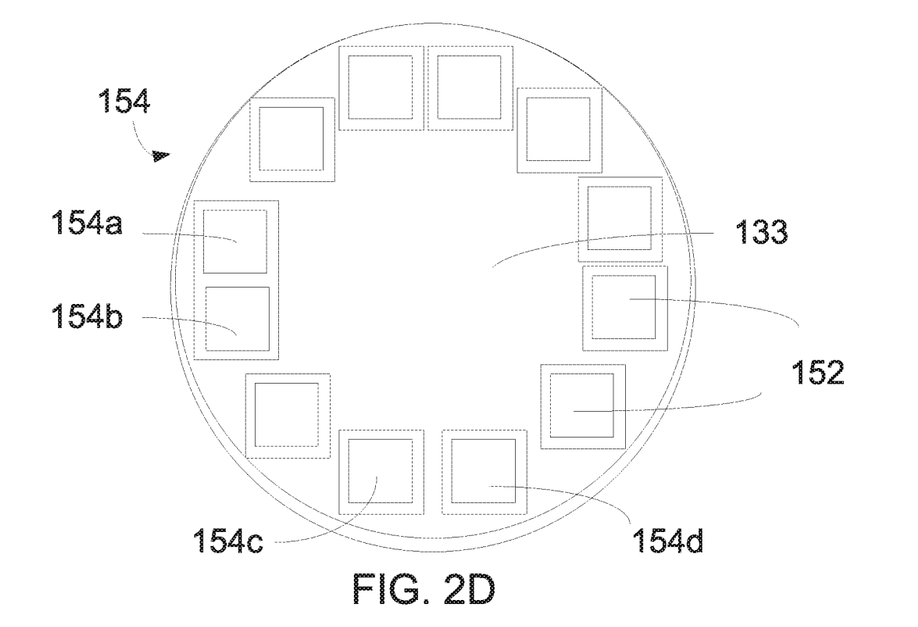

FIG. 2D includes a view of the bottom surface of the wiring board 154, according to another embodiment. The wiring board 154 can include at least one SiPMs 152. As seen in the embodiment of FIG. 2D, one or more SiPMs 152 can be towards the periphery of the wiring board 154. In one embodiment, individual SiPMs 152 can be spread apart from one another on the bottom surface 155 of the wiring board 154 with reflector material in between each SiPM. In another embodiment, one or more SiPM 152 may be spaced apart from one another with the reflector material 133 surrounding the one or more SiPMs. For example, a first SiPM 152a may be adjacent to a second SiPM 152b with the reflector 133 surrounding three sides of the first SiPM 152a and the second SiPM 152b. In another embodiment, a third SiPM 152c may be adjacent to a fourth SiPM 152d with the reflector 133 surrounding four sides of the third SiPM 152c and the fourth SiPM 152d.

Figure 2E:
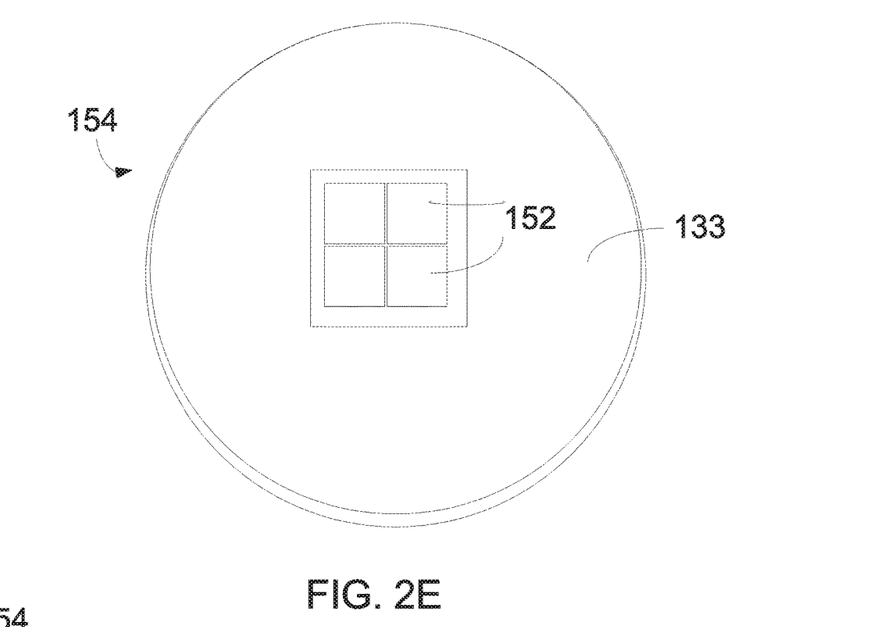

FIG. 2E includes a view of the bottom surface of the wiring board 154, according to one embodiment. The wiring board 154 can include at least one SiPMs 152. As seen in the embodiment of FIG. 2E, the SiPMs 152 can be a 2×2 matrix located towards the center of the wiring board 154. As seen in the embodiment of FIG. 2E, the reflector 133 can be spaced apart from the SiPMs 152 by a gap such that an exposed portion of the bottom surface of the wiring board 154 can be seen. In one embodiment, the reflector 133 surrounds two sides of the individual SiPMs and all four sides of the 2×2 matrix. In one embodiment, the one or more SiPMs 152 can have two sides adjacent another SiPM and two sides adjacent the reflector 133. In a embodiment that has only one SiPM, all four sides may be adjacent the reflector 133.

Figure 2F:
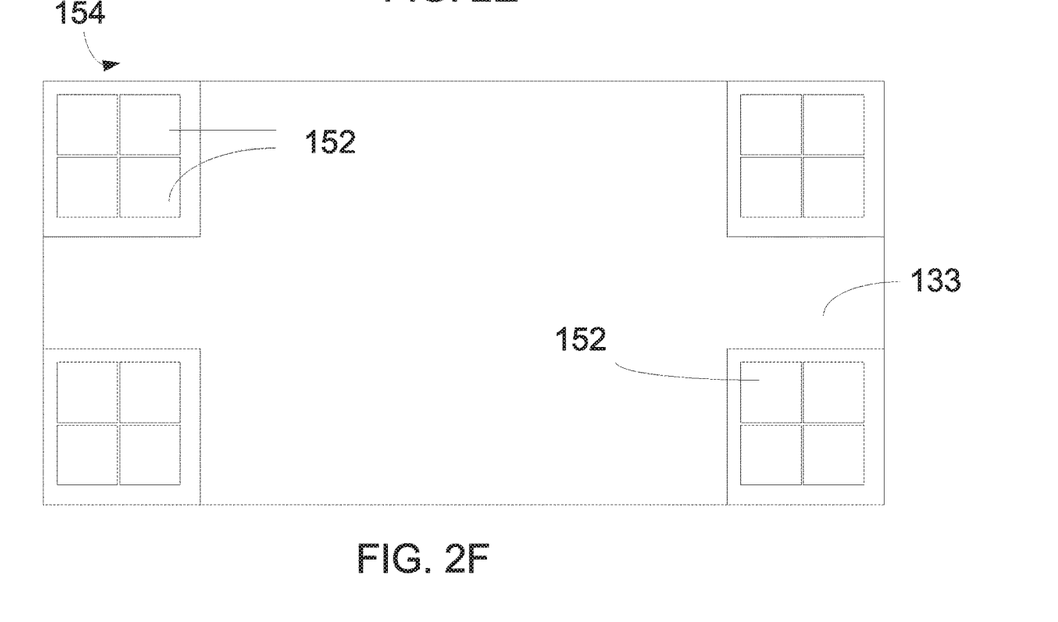

FIG. 2F includes a view of the bottom surface of the wiring board 154, according to another embodiment. The wiring board 154 can include at least one SiPMs 152. As seen in the embodiment of FIG. 2F, one or more SiPMs 152 can be towards the periphery of the wiring board 154. In one embodiment, 2×2 matrix SiPMs 152 can be spread apart from one another on the bottom surface 155 of the wiring board 154 with reflector material in between each matrix. In one embodiment, the wiring board 154 can include four 2×2 matrices. In another embodiment, the wiring board 153 can include more than one matrix. The matrix can be a 2×2 matrix, a 3×3 matrix, a 4×4 matrix, a 2×3 matrix, or any combination thereof. In one embodiment, the matrix of SiPMs 152 may be towards the corners of the wiring board 154. In another embodiment, the at least one matrix of SiPMs 152 may be towards the periphery of the wiring board 154. In another embodiment, the wiring board 152 can include a matrix of SiPMs 152 in one part and individual SiPMs in another part. The one or more matrices can be spaced apart from one another with the reflector material 133 in between each matrix. In one embodiment, the wiring board 154 can include a gap between each matrix of SiPMs 152 and the reflector 133.

Figure 3:
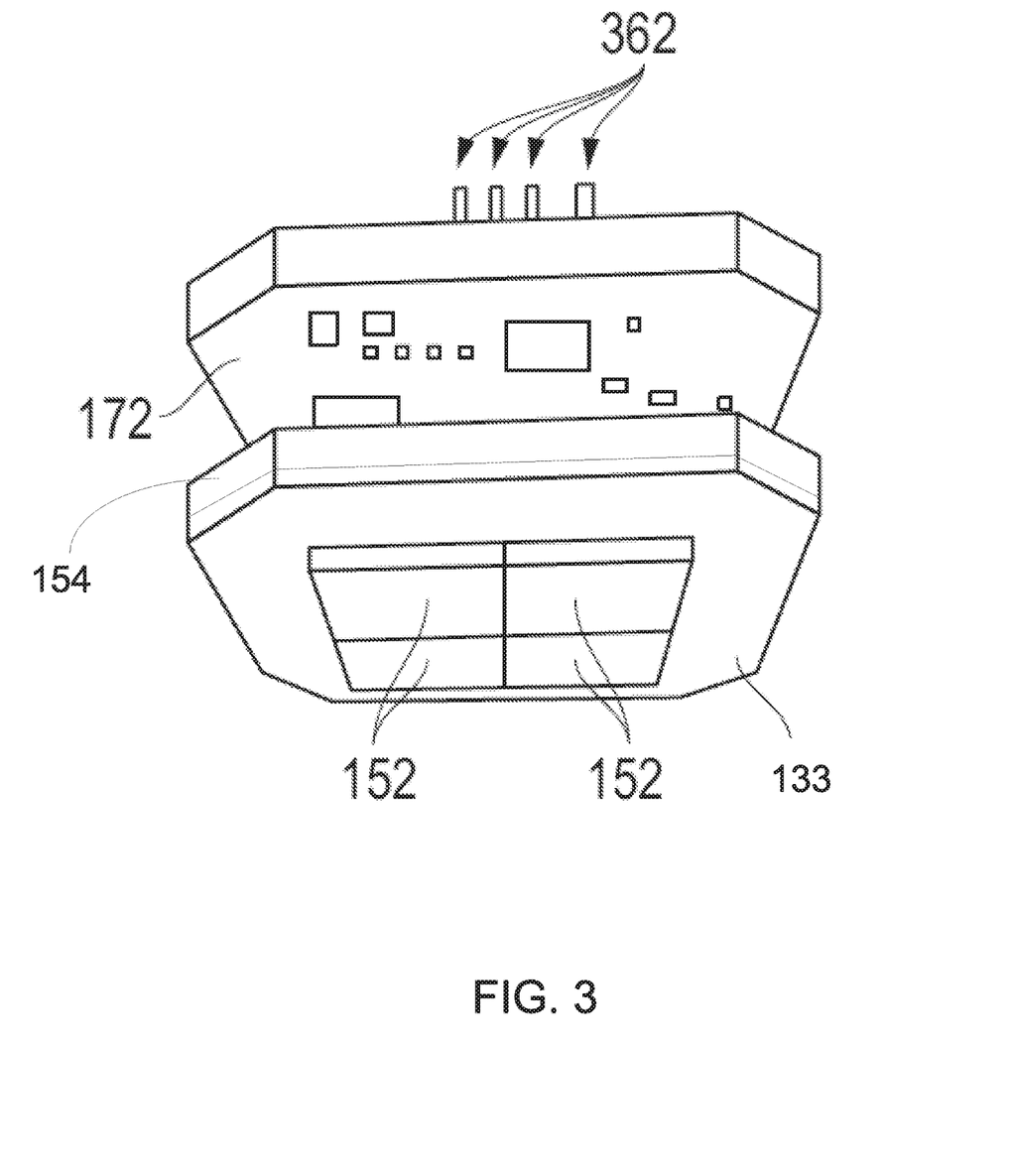
FIG. 3 includes an illustration of a perspective view of portions of a wiring board and an interface board of the apparatus of FIG. 1.
Figure 4:
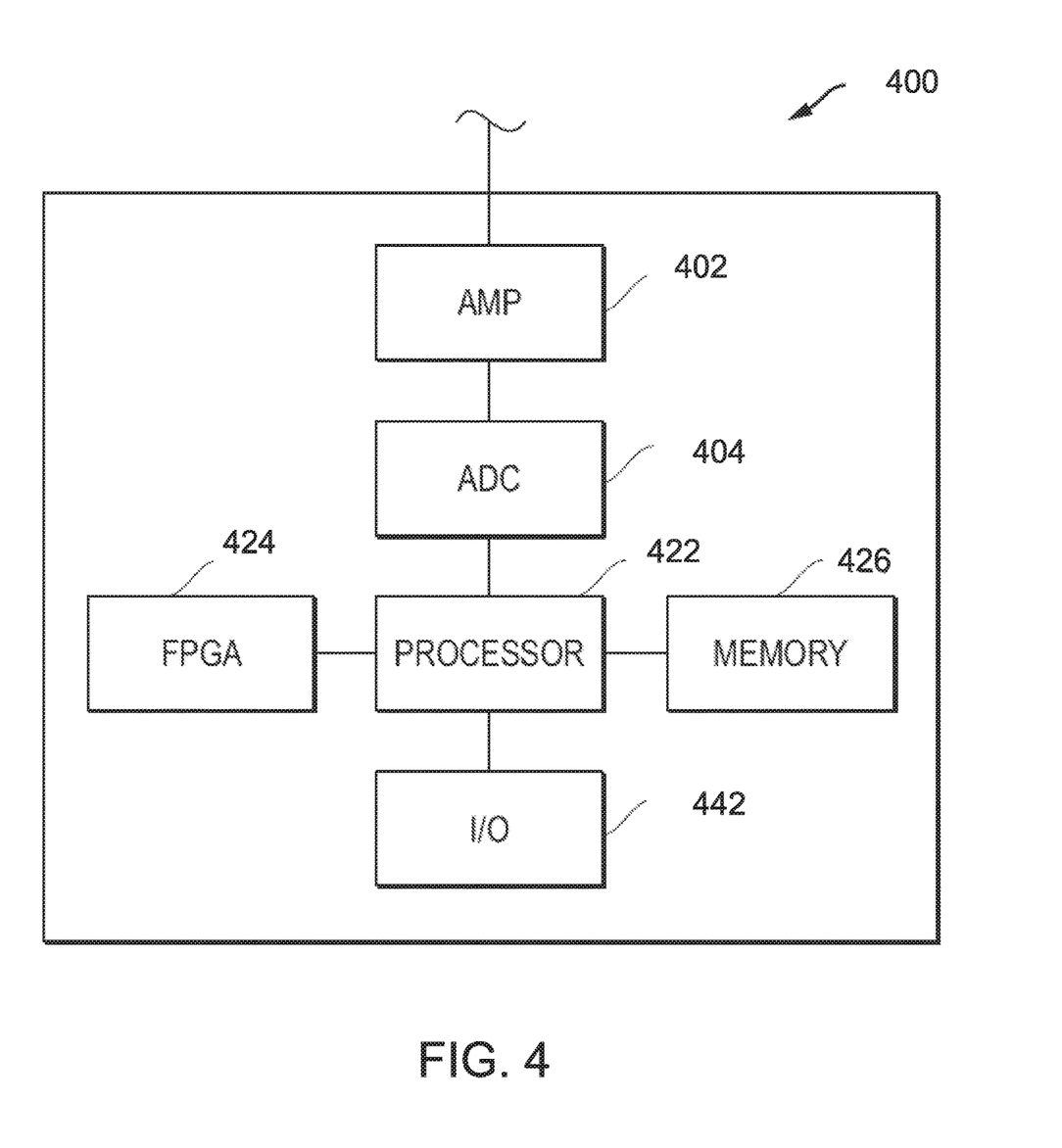
FIG. 4 includes a depiction of a control module that can be used in the apparatus of FIG. 1.

FIG. 3 illustrates the printed wiring board 154 and interface board 172 separated from each other. Four SiPMs are illustrated, although in another embodiment, more or fewer SiPMs may be used. Electronic components on the interface board 172 are illustrated but not individually labeled with reference numbers. The radiation detection apparatus 100 can include modular components such as the SIPMs 152 on the carrier board 154, the interface board 172, and the lid. The electronic components on the interface board 172 can be configured to act as a control module 400 as illustrated in FIG. 4. The semiconductor-based photomultiplier is coupled to an amplifier 402 within the control module 400. In an embodiment, the amplifier 402 can be a high fidelity amplifier. The amplifier 402 can amplify the electronic pulse, and the amplified electronic pulse can be converted to a digital signal at an analog-to-digital converter ("ADC") 404 that can be received by the processor 422. The processor 422 can be coupled to a programmable/re-programmable processing module ("PRPM"), such as a field programmable gate array ("FPGA") 424 or application-specific integrated circuit ("ASIC"), a memory 426, and an input/output ("I/O") module 442. The couplings may be unidirectional or bidirectional. In another embodiment, more, fewer, or different components can be used in the control module 400. For example, functions provided by the FPGA 424 may be performed by the processor 422, and thus, the FPGA 424 is not required. The FPGA 424 can act on information faster than the processor 422. Referring to FIGS. 1 and 4, the interface board 172 couples the photosensor, such as the SiPMs 152, and the control module 400 to each other. In one embodiment, the interface board 172 is removable coupled to the wiring board 154.

Figure 5:
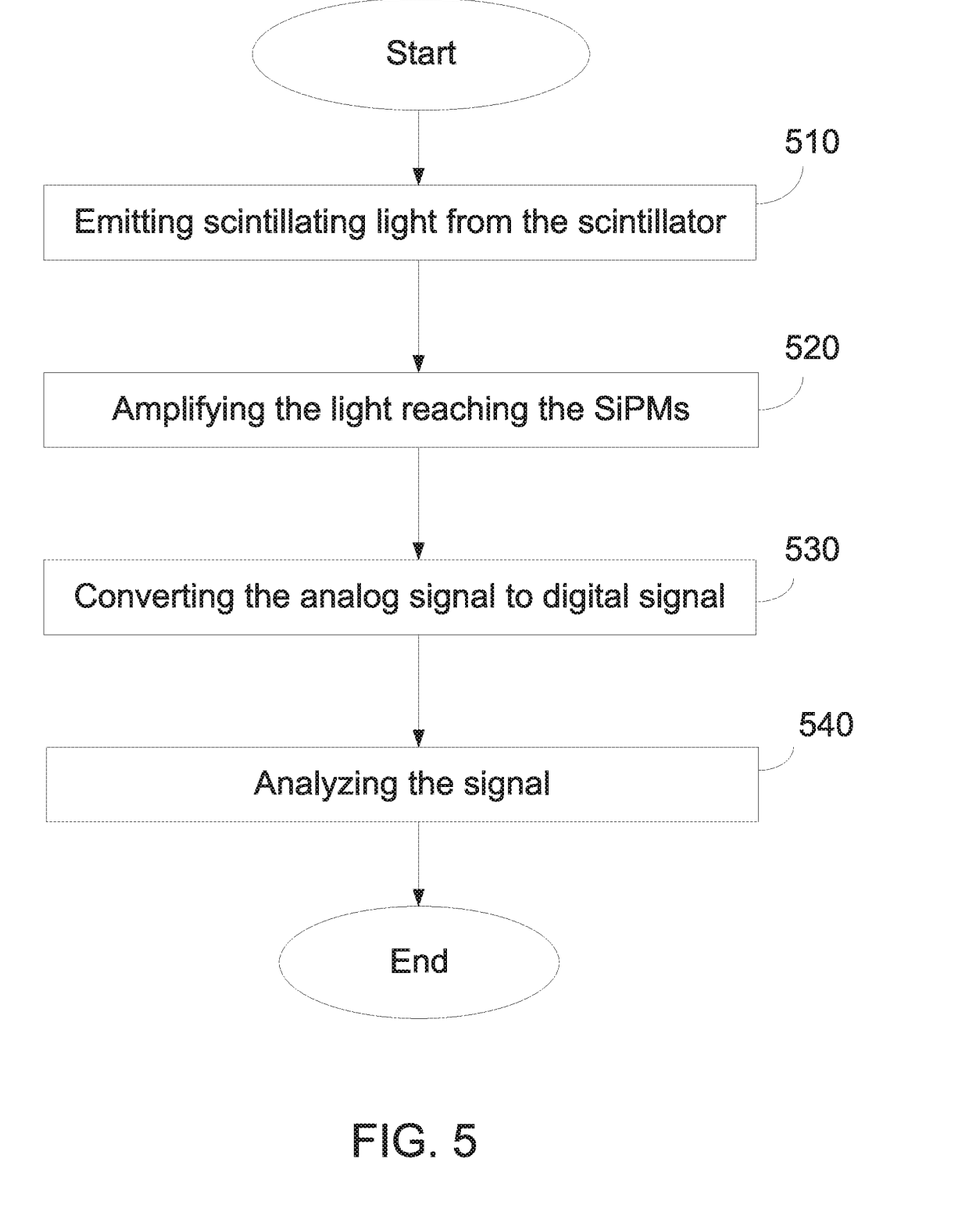
FIG. 5 includes a flow diagram of a method of using the apparatus of FIG. 1.

FIG. 5 includes a flow chart for using the radiation detection apparatus 100 in accordance with an exemplary embodiment. The method is described in conjunction with FIGS. 1 and 2A-2F. If an external connector has not been connected to the radiation detection apparatus 100, an external connector can be connected to the radiation detection apparatus 100 before performing the remainder of the method as described below.

A radiation source can be placed near the radiation detection apparatus 100. Radiation from the radiation source can be absorbed by the scintillator 120. The method can include emitting scintillating layer from the scintillator 120, at block 510. The scintillating light can be emitted in response to absorbing the radiation. The scintillating light can be received by the semiconductor-based photomultiplier that can generate an electronic pulse in response to receiving the scintillating light. In an embodiment, scintillating light from the scintillator passes through the optical coupler 140 to the SiPMs 152. The electronic pulse is an example of an analog signal. The method can further include amplifying the light reaching the SiPMs 152. In one embodiment, light can reflect from the reflector 133 to enhance the amount of light reaching the SiPMs 152. In one embodiment, the pulse height resolution (PHR) of the radiation detection apparatus 100 utilizing Cs-137 isotope 662 keV is 8% or less, such as less than 7.5%, or less than 7.4%, or less than 7.3%, or less than 7.2% or less than 7.1% or less than 7%, or less than 6.9%. The PHR of Cs-137 isotope scintillator was measured in a 2×2 silicon photomultiplier.

If needed or desired, the method can include converting the analog signal to a digital signal, at block 530. In particular, the amplified signal can be converted from an analog signal to a digital signal at ADC 404. The conversion of the signal is optional, as the analyzer may perform analysis using an analog signal. The signal, whether analog or digital, can be received by the processor 422.

The method can further include analyzing the signal, at block 540. The function can include any of the previously described function with respect to the control module 400. The analysis can be used to determine a characteristic of the radiation absorbed by the scintillator 120. The analysis can be performed by the processor 422 in conjunction with instructions that can be stored in memory 426, performed by the FPGA 424, or a combination of the processor 422 and FPGA 424. More radiation may be absorbed by the scintillator 120 that emits scintillating light that is received by the photosensor that generates another electronic pulse. The method can include analyzing another signal in accordance with another function. The electronic pulse can be processed similar to the manner as previously described to provide the other signal. This other signal can be analyzed by the processor 422, the FPGA 424, or both. The function can be any of the functions as previously described to determine a characteristic of the radiation.

Embodiments of the radiation detection apparatus having the semiconductor-based photomultiplier can allow for a significantly smaller size as compared to a radiation detection apparatus with a photomultiplier tube ("PMT"). A PMT detector can include a PMT, and a SiPM detector that includes semiconductor-based photomultipliers, and SiPMs in a particular embodiment. For each detector illustrated, the scintillator, the photosensor, the analyzer and the interface board are oriented along a length of the housing. For the SiPM detector, the combination of the photosensor, the analyzer and the interface board makes up at most 50%, at most 40%, or at most 25% of the length of the housing. For the PMT, the combination of the photosensor, the analyzer and the interface board makes up over 65% of the length of the housing.

Further, PMTs require substantially more voltage than semiconductor-based photomultipliers. Thus, an analyzer is not located in the PMT detector. Further, the power required for the PMT may exceed the voltage that the interface board 172 supports. Thus, the PMT detector is not only larger, but it also does not provide the functionality as previously described with respect to the radiation detector apparatuses previously described. Still further, the radiation detector apparatuses described herein is more rugged and can withstand more abuse or demanding conditions are compared to the PMT detector.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A radiation detection apparatus may include a scintillator to emit scintillating light in response to absorbing radiation, a photosensor to generate an electronic pulse in response to receiving the scintillating light, and a reflector surrounding the photosensor. The photosensor may be coupled to a wiring board and the reflector may be coupled to the wiring board.

Embodiment 2

The radiation detection apparatus of embodiment 1, further comprising a housing that contains the scintillator, the photosensor, and the reflector.

Embodiment 3

A radiation detection apparatus comprising a scintillator to emit scintillating light in response to absorbing radiation, a photosensor to generate an electronic pulse in response to receiving the scintillating light, wherein the photosensor has a surface area that is less than 70% of the scintillator and wherein the photosensor is on a first plane, a reflector surrounding the photosensor, wherein the reflector is on the first plane.

Embodiment 4

The radiation detection apparatus of any one of embodiments 1 or 3, wherein the reflector is a diffuse reflector.

Embodiment 5

The radiation detection apparatus of any one of embodiments 1 or 3, wherein the photosensor is at least one silicon photomultiplier (SiPM).

Embodiment 6

The radiation detection apparatus of any one of embodiments 1 or 3, wherein the reflector covers at least 1% of a surface area of the wiring board.

Embodiment 7

The radiation detection apparatus of any one of embodiments 1 or 3, wherein the reflector covers at least 50% of a surface area of the wiring board.

Embodiment 8

The radiation detection apparatus of any one of embodiments 1 or 3, wherein the reflector covers at least 95% of a surface area of the wiring board.

Embodiment 9

The radiation detection apparatus of any one of embodiments 1 or 3, further comprising a gap between the photosensor and the reflector.

Embodiment 10

The radiation detection apparatus of any one of embodiments 1 or 3, wherein the pulse height resolution is less than 7.5% for a Cs-137 isotope 662 keV.

Embodiment 11

The radiation detection apparatus of any one of embodiments 1 or 3, wherein the pulse height resolution is less than 7.2% for a Cs-137 isotope 662 keV.

Embodiment 12

The radiation detection apparatus of any one of embodiments 1 or 3, wherein the pulse height resolution is less than 7% for a Cs-137 isotope 662 keV.

Embodiment 13

The radiation detection apparatus of any one of embodiments 1 or 3, wherein the pulse height resolution is between 6.7% and 7.5% for a Cs-137 isotope 662 keV.

Embodiment 14

The radiation detection apparatus of any one of embodiments 1 or 3, wherein the photosensor is a semiconductor-based photomultiplier.

Embodiment 15

The radiation detection apparatus of embodiment 14, wherein the semiconductor-based photomultiplier is an avalanche photodiode.

Embodiment 16

A method of using radiation detection apparatus comprising providing housing containing a scintillator, a photosensor, and a reflector on the same plane as the photosensor, wherein the scintillator is configured to emit scintillating light in response to absorbing radiation, the photosensor is configured to generate an electronic pulse in response to receiving the scintillating light, the reflector is configured to direct the scintillating light to the photosensor; and producing a pulse height resolution of less than 7.5% for a Cs-137 isotope 662 keV.

Embodiment 17

The method of embodiment 16, further comprising emitting scintillating light from the scintillator in response to absorbing radiation, transmitting an analog signal from the photosensor; and converting the analog signal to a digital signal.

Embodiment 18

The method of embodiment 16, wherein providing the housing comprising providing a sealed housing.

Embodiment 19

The method of embodiment 16, wherein the pulse height resolution is less than 7.2% for a Cs-137 isotope 662 keV.

Embodiment 20

The method of embodiment 16, wherein the pulse height resolution is less than 7% for a Cs-137 isotope 662 keV.

Embodiment 21

The method of embodiment 16, wherein the pulse height resolution is between 1% and 7.5% for a Cs-137 isotope 662 keV.

Embodiment 22

The radiation detection apparatus of any one of embodiments 1 or 3, wherein a surface area of the reflector is at least 1% of a surface area of the scintillator.

Embodiment 23

The radiation detection apparatus of any one of embodiments 1 or 3, wherein a surface area of the reflector is at least 50% of a surface area of the scintillator.

Embodiment 24

The radiation detection apparatus of any one of embodiments 1 or 3, wherein a surface area of the reflector is at least 95% of a surface area of the scintillator.

Embodiment 25

A radiation detection apparatus may include a scintillator to emit scintillating light in response to absorbing radiation, a photosensor on a first plane to generate an electronic pulse in response to receiving the scintillating light, and a reflector on the first plane surrounding the photosensor.

Embodiment 26

The radiation detection apparatus of embodiment 25, where the apparatus has a delta pulse height resolution between 0.1% and 1.9%.

Embodiment 27

The radiation detection apparatus of embodiment 25, where the scintillator includes a material of lanthanum bromide.

Embodiment 28

The radiation detection apparatus of embodiment 27, where the apparatus has a delta pulse height resolution between 0.1% to 1.0%.

Embodiment 29

The radiation detection apparatus of embodiment 25, where the scintillator comprises a material of NaI(Tl).

Embodiment 30

The radiation detection apparatus of embodiment 29, where the apparatus has a delta pulse height resolution between 0.4% to 0.6%.

Embodiment 31

The radiation detection apparatus of embodiment 25, where the scintillator comprises a material of NaI(Tl+Li).

Embodiment 32

The radiation detection apparatus of embodiment 31, where the apparatus has a delta pulse height resolution between 0.6% to 1.9%.

Examples

The pulse height resolution (PHR) of various scintillators were compared within an apparatus that utilizes a PMT vs an SiPM. The pulse height resolution (PHR) is expressed in % and is defined as the full width of the peak at one-half its height divided by the channel number or energy. Size is the size of the scintillator crystal within the apparatus. Delta PHR is the difference of the PHR between the SiPM with reflector and PMT with no reflector.

TABLE 1

| | Scintillator | Size | PMT no reflector PHR | SiPM with reflector PHR | Delta PHR | SiPM PHR no reflector | #SiPM |
|---|---|---|---|---|---|---|---|
| Sample 1 | Lanthanum Bromide | 2" × 2" | 3.90% | 4.52% | 0.62% | 5.22% | 16 |
| Sample 2 | Lanthanum Bromide | 1.5" × 1.5" | 3.21% | 3.61% | 0.40% | 3.95% | 16 |
| Sample 3 | Cs2LiLaBr6(Ce) | 2" × 2" | 3.65% | 4.51% | 0.86% | 5.35% | 16 |
| Sample 4 | NaI(Tl) | 3" × 3" | 6.69% | 7.70% | 1.01% | 10.29% | 16 |
| Sample 5 | NaI(Tl) | 2" × 4" × 4" | 7.34% | 8.33% | 0.99% | — | 16 |
| Sample 6 | NaI(Tl) | 2" × 2" | 6.45% | 6.60% | 0.15% | 7.31% | 16 |
| Sample 7 | NaI(Tl + Li) | 2" × 4" × 4" | 8.41% | 10.37% | 1.96% | — | 16 |
| Sample 8 | NaI(Tl + Li) | 2" × 4" | 6.57% | 7.91% | 1.34% | — | 16 |
| Sample 9 | NaI(Tl + Li) | 3" × 3" | 7.83% | 9.14% | 1.31% | — | 16 |
| Sample 10 | NaI(Tl + Li) | 1.5" × 4" × 4" | 7.35% | 8.01% | 0.66% | — | 16 |

As can be seen in Table 1, the PHR was measured for a PMT with no reflector, a SiPM with reflector, and a SiPM with no reflector. Pulse-heights are generated from photoelectric interaction within the crystal that creates a pulse height that are proportional to energy deposited in the crystal. Energy deposited depends on the defection of the gamma ray. The lower the PHR, the better the ability of the detector to distinguish the different types of gamma isotopes. Samples 1 and 2 compare the PHR of a scintillator utilizing a lanthanum bromide crystal. The PHR of a SiPM with reflector shows a lower PHR than a SiPM without reflector. The PHR of a SiPM with reflector utilizing a lanthanum bromide crystal is within between 0.15% to 1.01% of the PHR of a PMT with no reflector.

Sample 3 compares the PHR of a scintillator utilizing a 2"×2" CLLB crystal. The PHR of a SiPM with reflector shows a lower PHR than a SiPM without reflector in Sample 3.

Samples 4-6 compare the PHR of a scintillator utilizing a NaI(Tl) crystal. The PHR of a SiPM with reflector shows a lower PHR than a SiPM without reflector. The PHR of a SiPM with reflector utilizing a NaI(Tl) crystal is within between 0.4% to 0.62% of the PHR of a PMT with no reflector.

Samples 7-10 compare the PHR of a scintillator utilizing a NaI(Tl+Li) crystal. The PHR of a SiPM with reflector utilizing a NaI(Tl+Li) crystal is within between 0.66% to 1.96% of the PHR of a PMT with no reflector.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and apparatuses that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection apparatus comprising:
   a scintillator to emit scintillating light in response to absorbing radiation;
   a photosensor to generate an electronic pulse in response to receiving the scintillating light, wherein the photosensor is on a first plane, and wherein the photosensor is an SiPM comprising a quenching resistor; and
   a reflector adjacent a periphery of the photosensor, wherein the reflector surrounds the photosensor, wherein the reflector is on the first plane, and wherein the apparatus has a delta pulse height resolution between 0.1% and 1.9%.

2. The radiation detection apparatus of claim 1, further comprising a housing that contains the scintillator, the photosensor, and the reflector.

3. The radiation detection apparatus of claim 1, wherein the reflector is placed on the wiring board, wherein the photosensor is coupled to a wiring board, and wherein the reflector covers at least 50% of a surface area of the wiring board.

4. The radiation detection apparatus of claim 1, wherein the scintillator comprises a material of lanthanum bromide.

5. The radiation detection apparatus of claim 4, wherein the apparatus has a delta pulse height resolution between 0.1% to 1.0%.

6. The radiation detection apparatus of claim 1, wherein the scintillator comprises a material of NaI(Tl).

7. The radiation detection apparatus of claim 6, wherein the apparatus has a delta pulse height resolution between 0.4% to 0.6%.

8. The radiation detection apparatus of claim 1, wherein the scintillator comprises a material of NaI(Tl+Li).

9. The radiation detection apparatus of claim 8, wherein the apparatus has a delta pulse height resolution between 0.6% to 1.9%.

10. A radiation detection apparatus comprising:
a scintillator to emit scintillating light in response to absorbing radiation;
a photosensor to generate an electronic pulse in response to receiving the scintillating light, wherein the photosensor has a surface area that is less than 70% of the scintillator and wherein the photosensor is on a first plane;
a reflector adjacent a periphery of the photosensor, wherein the reflector is on the first plane, and wherein the reflector covers at least 30% of a surface area of a wiring board, wherein the pulse height resolution is less than 7.5% for a Cs-137 isotope 662 keV.

11. The radiation detection apparatus of claim 10, wherein the reflector is a diffuse reflector.

12. The radiation detection apparatus of claim 10, wherein the photosensor comprises at least one silicon photomultiplier (SiPM).

13. The radiation detection apparatus of claim 10, wherein the reflector covers at least 95% of a surface area of the wiring board.

14. The radiation detection apparatus of claim 10, wherein the pulse height resolution is less than 7.2% for a Cs-137 isotope 662 keV.

15. The radiation detection apparatus of claim 10, wherein the pulse height resolution is less than 7% for a Cs-137 isotope 662 keV.

16. The radiation detection apparatus of claim 10, wherein the pulse height resolution is between 1% and 7.5% for a Cs-137 isotope 662 keV.

17. A method of using radiation detection apparatus comprising:
providing housing containing a scintillator, a photosensor, and a reflector on the same plane as and surrounding the photosensor, wherein:
the scintillator is configured to emit scintillating light in response to absorbing radiation;
the photosensor is configured to generate an electronic pulse in response to receiving the scintillating light;
the reflector is configured to direct the scintillating light to the photosensor; and
producing a pulse height resolution of less than 7.5% for a Cs-137 isotope 662 keV.

18. The method of claim 17, further comprising:
emitting scintillating light from the scintillator in response to absorbing radiation;
transmitting an analog signal from the photosensor; and
converting the analog signal to a digital signal.

* * * * *